United States Patent
Wolf-Monheim

(10) Patent No.: US 10,792,966 B2
(45) Date of Patent: Oct. 6, 2020

(54) VEHICLE LEAF SPRING ASSEMBLY

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 16/206,608

(22) Filed: Nov. 30, 2018

(65) Prior Publication Data
US 2019/0168556 A1 Jun. 6, 2019

(30) Foreign Application Priority Data
Dec. 1, 2017 (DE) .................... 10 2017 221 644

(51) Int. Cl.
*B60G 11/12* (2006.01)
*B60G 3/16* (2006.01)
*B60G 11/113* (2006.01)
*B60G 17/02* (2006.01)

(52) U.S. Cl.
CPC .............. *B60G 3/16* (2013.01); *B60G 11/113* (2013.01); *B60G 17/023* (2013.01); *B60G 2202/11* (2013.01); *B60G 2204/43* (2013.01); *B60G 2206/428* (2013.01)

(58) Field of Classification Search
CPC ...... B60G 3/16; B60G 11/113; B60G 17/023; B60G 2206/428; B60G 2202/11; B60G 2204/43
USPC ...................... 280/124.17, 124.174, 124.175
See application file for complete search history.

(56) References Cited

U.S. PATENT DOCUMENTS

| | | | |
|---|---|---|---|
| 2,984,477 A | 5/1961 | Janulis | |
| 4,004,826 A * | 1/1977 | Subhedar | B60G 11/04 280/124.176 |
| 4,022,449 A | 5/1977 | Estorff | |
| 4,433,833 A * | 2/1984 | Tabe | B60G 11/04 267/218 |
| 4,452,435 A * | 6/1984 | Shinbori | B60G 17/0275 267/214 |
| 4,456,232 A * | 6/1984 | Shinbori | F16F 1/22 267/214 |
| 4,519,590 A | 5/1985 | Wells | |

(Continued)

FOREIGN PATENT DOCUMENTS

GB 2152627 A 8/1985

*Primary Examiner* — Toan C To
(74) *Attorney, Agent, or Firm* — Raymond L. Coppiellie; Burgess Law Office, PLLC

(57) ABSTRACT

A leaf spring assembly for a wheel suspension of a motor vehicle including a leaf spring resiliently supporting of a wheel carrier on a vehicle body of the motor vehicle. The leaf spring has a first end portion, and a diametrically or longitudinally, opposite second end portion fastened, pivotably mounted, to the vehicle. The leaf spring includes a suspension portion extending between the two end portions. The leaf spring includes two spring leaves held pressed one against the other by a first clamp in the suspension portion and are held pressed one against the other by a second clamp distanced or longitudinally spaced from the first clamp. The position of the second clamp, its position on the leaf spring, is variable in the direction of the longitudinal axis of the leaf spring.

12 Claims, 2 Drawing Sheets

(56) References Cited

U.S. PATENT DOCUMENTS

| | | | | |
|---|---|---|---|---|
| 5,826,896 A | * | 10/1998 | Baumann | B60G 11/10 |
| | | | | 280/124.171 |
| 5,988,614 A | * | 11/1999 | Sturmon | B60G 7/02 |
| | | | | 267/292 |
| 6,056,276 A | * | 5/2000 | Muzio | F16F 1/20 |
| | | | | 267/36.1 |
| 2009/0302513 A1 | | 12/2009 | Mitsuru et al. | |
| 2012/0133090 A1 | * | 5/2012 | Spencer | B60G 11/36 |
| | | | | 267/289 |
| 2012/0153594 A1 | * | 6/2012 | Heimann | B60G 21/026 |
| | | | | 280/124.175 |
| 2015/0343875 A1 | * | 12/2015 | Spiegel | B60G 11/02 |
| | | | | 280/5.515 |

\* cited by examiner

VEHICLE LEAF SPRING ASSEMBLY

CROSS-REFERENCE TO RELATED APPLICATIONS

Not Applicable.

BACKGROUND OF THE INVENTION

1. Field of the Invention

The present invention relates generally to a motor vehicle wheel suspension; and more specifically to a leaf spring assembly resiliently supporting a wheel carrier on a vehicle body.

2. Description of Related Art

Leaf spring assemblies that resiliently support a wheel carrier on a motor vehicle are commonly known. A wheel carrier is any device or mechanism establishing a mechanical connection between a vehicle wheel, held by the wheel carrier, and the wheel suspension of the motor vehicle. Commercial vehicles, for example smaller and larger trucks, utilize suspension systems having leaf spring assemblies. The leaf springs oriented and extending longitudinally on the motor vehicle in a direction running substantially parallel to a longitudinal direction of the motor vehicle.

Although known leaf spring assemblies for motor vehicles provide various advantages, including a simple structure, high robustness, low manufacturing costs, and virtually no maintenance, there is a need for better and easier adaptation to different loads and/or driving conditions of the motor vehicle.

SUMMARY OF THE INVENTION

A leaf spring assembly for a motor vehicle wheel suspension having a leaf spring with a first end portion, including having a first fastener assembly, a second end portion, diametrically opposite said first end portion, including a second fastener assembly, and a suspension portion, the suspension portion extending between the two end portions. The leaf spring has a plurality of spring leaves.

The leaf spring assembly also includes a first clamp attached to the leaf spring in the suspension portion and pressing the spring leaves against one another and a second clamp attached to the leaf spring in the suspension portion and pressing the spring leaves against one another.

The second clamp is positioned longitudinally spaced from the first clamp in the direction of a longitudinal axis of the leaf spring wherein the position of the second clamp on the suspension portion varies longitudinally, in the direction of the longitudinal axis of the leaf spring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. In the different figures, parts which are equivalent in terms of their function are always provided with the same reference symbols, so that these are generally also only described once.

Figure 1:
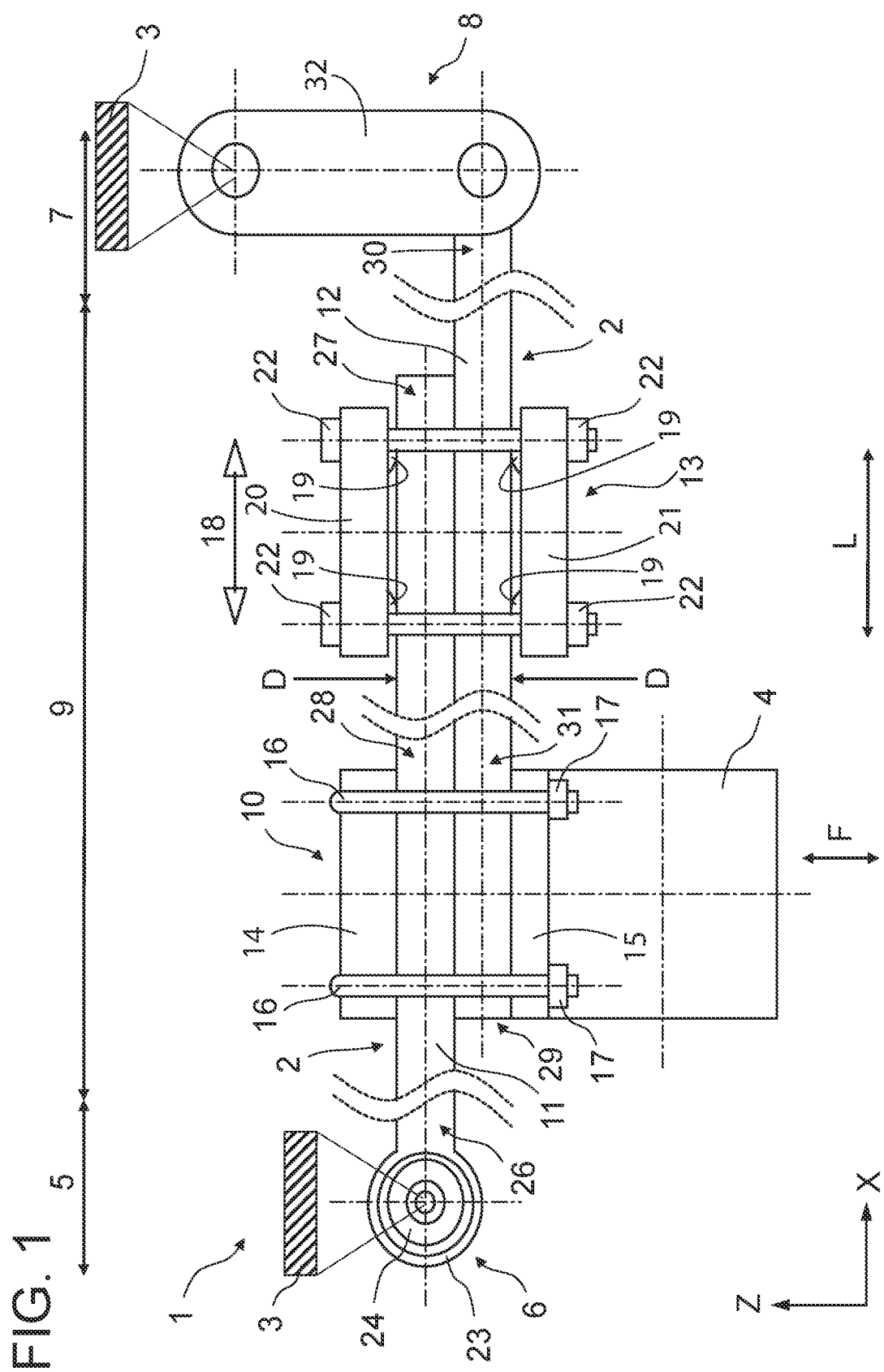
FIG. 1 is a schematic, side view of an illustrative embodiment of a leaf spring assembly according to the invention.

FIG. 1 is a schematic, side view of an illustrative embodiment of a leaf spring assembly 1 for a wheel suspension of a motor vehicle. The leaf spring assembly 1 shown, for example, in an installed state on a motor vehicle, not shown, extending longitudinally, in a longitudinal axis L, substantially parallel to the longitudinal direction of the motor vehicle. FIG. 1 shows the leaf spring assembly 1 on one side of a vehicle. The motor vehicle is typically constructed symmetrically regarding the leaf spring assembly 1, wherein both vehicle sides use the leaf spring assembly 1 in FIG. 1.

Figure 2:
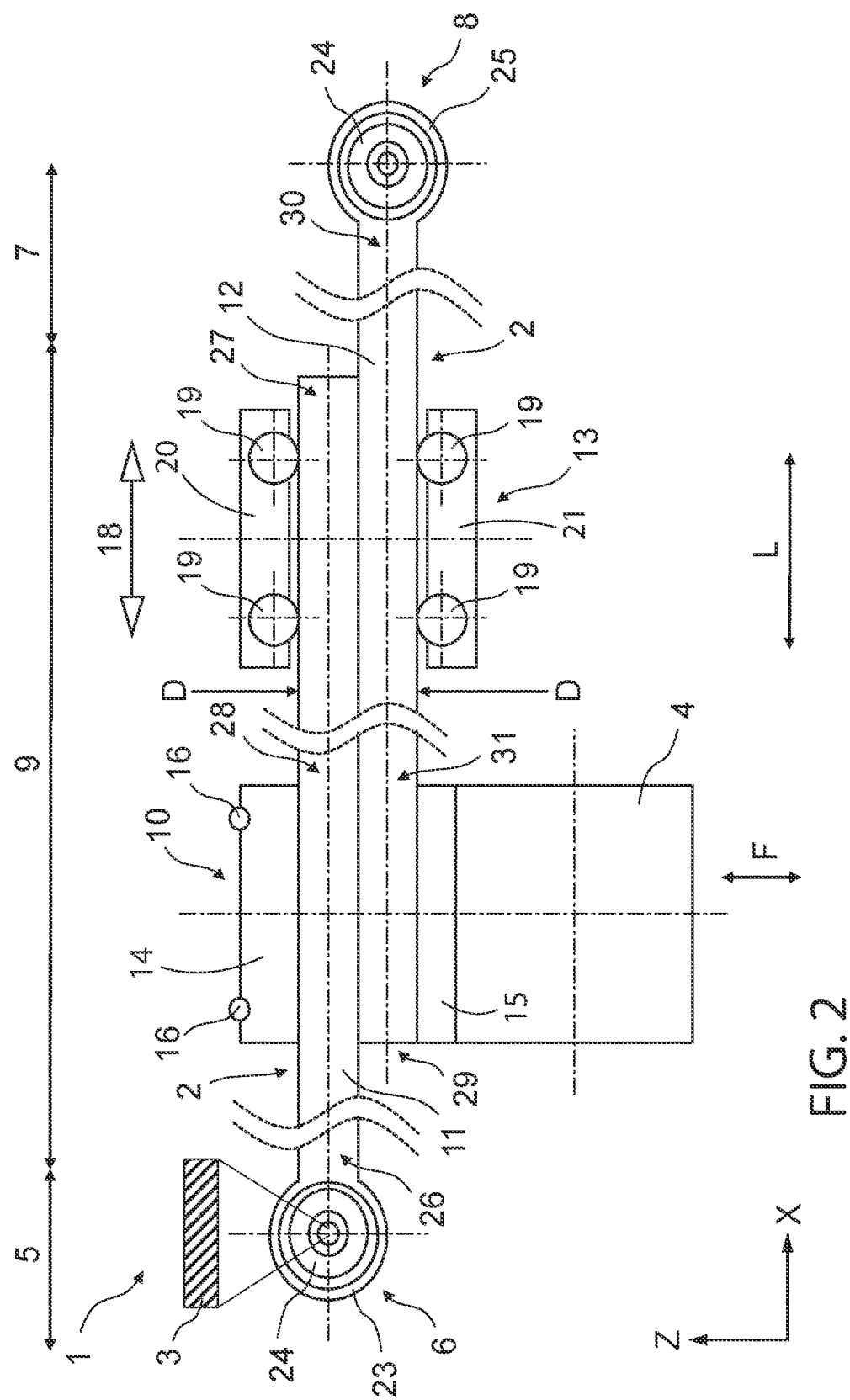
FIG. 2 is a schematic, lateral longitudinal section through the leaf spring assembly of FIG. 1, along a sectional plane situated parallel to the drawing plane (X-Z plane) of FIG. 1.

FIG. 2 is a schematic illustration of a lateral, longitudinal section through the leaf spring assembly 1 of FIG. 1 taken along a sectional plane situated parallel to the drawing plane (X-Z plane) of FIG. 1.

The leaf spring assembly 1 includes a leaf spring 2 resiliently supporting a wheel carrier, not shown, on a vehicle body, shown schematically at 3 in FIGS. 1 and 2, of the motor vehicle. In an illustrative embodiment of the leaf spring assembly 1 in FIGS. 1 and 2, the wheel carrier is held on a rigid axle 4, fastened to the leaf spring 2.

As illustrated in FIGS. 1 and 2 the leaf spring 2 has a first end portion 5, including a first fastener assembly, seen generally at 6, fastening the leaf spring 2 to the vehicle body 3, and a second end portion 7 lying diametrically opposite the first end portion 5, including a second fastener assembly, seen generally at 8, fastening the leaf spring 2 to the vehicle body 3. The leaf spring 2 includes a suspension portion 9, extending between the two end portions 5 and 7. A clamp or third fastener 10 fastens or connects the leaf spring 2 to the wheel carrier, shown here as the rigid axle 4.

FIGS. 1 and 2 illustrate the leaf spring 2 with two spring leaves 11, 12. One spring leaf 11 referred to as the first or upper spring leaf, with the second spring leaf 12 referred to as the second or lower spring leaf. The clamp 10 holds the spring leaves 11, 12. The clamp 10 presses the leaves 11, 12 against one another in the suspension portion 9. The leaf spring assembly 1 in FIGS. 1 and 2 may include other configurations of the clamp or third fastener.

FIGS. 1 and 2 show the two spring leaves 11, 12 pressed one against the other by a second clamp 13, distanced or separated from the first clamp 10, in the direction of longitudinal axis L of the leaf spring 2, and attached to the leaf spring 2 in the suspension portion 9 of the leaf spring 2.

FIG. 1 shows the first clamp 10 including an upper pressure plate 14, which bears against the top side of the upper spring leaf 11, and a lower pressure plate 15, which bears against the bottom side of the lower spring leaf 12. The two pressure plates 14 and 15 are held together with two U-shaped bolts or clips 16 and fasteners 17. The fasteners 17 cooperate with the U-shaped bolts 16 to exert a compressive or clamping force on the two spring leaves 11, 12. The leaf spring assembly 1 includes the first clamp 10 attached at a predetermined fixed position to the leaf spring 2.

A directional arrow 18 illustrates a motional direction, direction or movement or change in position of the second clamp 13, attached to the leaf spring 2 along the longitudinal axis L of the leaf spring 2. An aspect of the invention includes the ability to change the position of the second clamp 13 on the leaf spring 2, in the direction of longitudinal axis L of the leaf spring 2; the second clamp varies in position on the leaf spring 2 steplessly in a non-destructive manner, and hence without loss of function.

Adjusting the position of the second clamp 13 along the longitudinal axis L of the leaf spring 2 in the motional direction 18 alters the distance or spacing of the second clamp 13 from the fixed, first clamp 10 and changes the length of the connecting path of the first and second spring leaves 11, 12 of the leaf spring 2. The connecting path being the suspension portion 9 of the leaf spring 2 delimited by the first and second clamps 10, 13 and substantially effective in promoting the spring action of the leaf spring 2 in its suspension portion 9. The respective position of the second clamp 13 influences the spring rate of the leaf spring 2—the ratio of the force F acting on the leaf spring 2 to the induced excursion or deflection of the leaf spring 2. Besides the actual spring rate of the leaf spring 2, the ground clearance of the motor vehicle, which statically loads the leaf spring 2 with its weight, is likewise alterable.

FIGS. 1 and 2 show that the leaf spring 2, at least in that part of the suspension portion 9 in which the position of the second clamp 13 varies in the motional direction 18, has a substantially constant thickness D.

The second clamp 13 of the leaf spring assembly 1 in FIGS. 1 and 2 transmits a compressive force, exerted on the first and second spring leaves 11, 12, via elastomeric contact elements 19 bearing against respective adjacent surfaces of the first and second spring leaves 11,12. The elastomeric contact elements 19 in the longitudinal sectional view of the leaf spring assembly 1 in FIG. 2. The second clamp 13 of the leaf spring assembly 1 includes four elastomeric contact elements 19, configured in the illustrative embodiment as elastomeric rollers. As seen in FIG. 2, two of the four elastomeric rollers 19 are held on an upper pressure plate 20 of the second clamp 13, with the remaining two of the four elastomeric rollers 19 held on a lower pressure plate 21 of the second clamp 13. The two pressure plates 20, 21 held together, see FIG. 1, by four fasteners 22, for example threaded bolts and nuts, which, in the side view of FIG. 1, only two can be seen. The fasteners 22 exert a compressive force on the upper and lower spring leaves 11,12 through the two pressure plates 20 and 21 and the respective elastomeric rollers 19. The four elastomeric rollers 19 are each rotatably mounted in the respective pressure plates 20, 21.

A mechanical, electrical, hydraulic and/or pneumatic actuator, including any possible combination of these or other types, connects to and controls rotation of the elastomeric rollers 19. The actuator operable or activatable manually, for example by a user of the motor vehicle, or automatically, for example automatically as a function of a load condition and/or driving condition determined by an electronic control unit of the motor vehicle. Upon actuation, rotation of the elastomeric rollers 19 enables adjustment, movement in the motional direction 18 of the second clamp 13 along the leaf spring 2 in the direction the longitudinal axis L of the leaf spring 2. The actuator applies a displacement force to move the second clamp 13. The second clamp 13 can also be adjustable by a direct rotary drive of the elastomeric rollers 19, for instance by means of an electric motor, possibly with the interposition of a gear mechanism.

FIGS. 1 and 2 show the first fastener assembly including 6 a first fastening eye 23, configured in the first end portion 5 of the leaf spring 2, and a rubber-metal bushing 24, disposed in the first fastening eye 23. The first fastener assembly 6 pivotally attaching the leaf spring assembly 1 to the vehicle body 3. FIG. 2 shows the second fastener assembly 8 has a second fastening eye 25, configured in the second end portion 7 of the leaf spring 2. FIG. 1 shows an intermediate connection member 32 pivotally mounted on the second end portion 7, via a rubber-metal bushing 24 in the second fastening eye 25. The intermediate connection member 32 has a rod-shaped or link-shaped configuration, with one end thereof forming a portion of the second fastener 8 pivotally connecting the leaf spring assembly 1 to the vehicle body 3.

FIGS. 1 and 2 show the first or upper spring leaf 11 having a first, upper spring leaf end 26 forming the first end portion 5 of the leaf spring 2. A second, upper spring leaf end 27, lying diametrically opposite the first, upper spring leaf end 26 of the first or upper spring leaf 11, wherein the first, upper spring leaf end 26 of the first or spring leaf 11 forms the first end portion 5 of the leaf spring 2. A first or upper spring leaf portion 28 extends between the first and second, upper spring leaf ends 26, 27. The first or upper spring leaf portion 28 extending in the suspension portion 9 of the leaf spring 2, but not up to or into the second end portion 7 of the leaf spring 2; the second, upper spring leaf end 27 is spaced from and not part of the second end portion 7.

The second or lower spring leaf 12 has a first, lower spring leaf end 29 and a second, lower spring leaf end 30 lying diametrically opposite the first, over spring leaf end 29. A second or lower spring leaf portion 31 extends between the first and second lower, spring leaf ends 29, 30, wherein the second, lower spring leaf end 30 of the second or lower spring leaf 12 forms the second end portion 7 of the leaf spring 2. The second or lower spring leaf portion 31 extends in the suspension portion 9 of the leaf spring 2, but not up to or into the first end portion 5 of the leaf spring 2; the first, lower spring leaf end 29 is spaced from and not part of the first end portion 5.

The first or upper spring leaf portion 28, including the second, upper spring leaf end 27 of the first or upper spring leaf 11, and the second or lower spring leaf portion 31, including the first, lower spring leaf end 29 of the second or lower spring leaf 12, together form the suspension portion 9 of the leaf spring 2.

The above-described leaf spring assembly is not confined to the embodiments disclosed, but also includes same-acting further embodiments that emerge from technically sensible further combinations of the features of the leaf spring assembly 1 described. It is conceivable, for example, to arrange the first fastener assembly 6 of the leaf spring assembly 1 approximately midway between the two end portions 5, 7 of a leaf spring 2 in its suspension portion and, provide multiple second clamps 13 on both sides of the first clamp 10, in total two second clamps, arranged displaceably in the direction of longitudinal extent of the leaf spring 2 to create a substantially symmetrical leaf spring assembly 1.

In a preferred embodiment, the leaf spring assembly 1 is used in a wheel suspension for resiliently supporting a wheel carrier, including a rigid axle that holds or supports the wheel carrier, on a motor vehicle, for example, a commercial vehicle, such as a truck.

The leaf spring assembly 1 includes a leaf spring 2 resiliently supporting a wheel carrier on a vehicle body of the motor vehicle. A wheel carrier should be understood as any device that mechanically connects a vehicle wheel to the wheel suspension of the motor vehicle. The leaf spring 2 includes a first end portion 5, containing a first, upper leaf spring end 26 of the first or upper spring leaf 11. The first fastener assembly 6 connects the leaf spring 2 to the vehicle body. The leaf spring 2 includes a second end portion 7, containing a second, lower leaf spring end 30 of the second or lower spring leaf 12, lying diametrically opposite the first, upper leaf spring and 26 of the first or upper spring leaf 11. The second fastener assembly 8 connects the second, lower leaf spring 12 to the vehicle body. A suspension portion 9 extends between the two end portions 5, 7 and includes a third fastener assembly or first clamp 10 connecting the leaf spring 2 to the rigid axle 4 and ultimately the wheel carrier. In contrast to the two end portions 5, 7, which fasten the leaf spring 2 to the vehicle body or to an auxiliary frame connected to the vehicle body, the suspension portion 9, by its elastic bending capability, provides the actual spring action of the leaf spring 2.

The leaf spring 2 of the leaf spring assembly 1 includes two spring leaves 11, 12; i.e., a first and a second spring leaf, held pressed one against the other by the first clamp 10 in the suspension portion 9. The spring leaves 11, 12 also held pressed one against the other by the second clamp 13, attached to the leaf spring 2 and longitudinally distanced from the first clamp 10 in the longitudinal direction L of the leaf spring 2. Longitudinal direction L should be understood as the direction the leaf spring 2 extends, from the first end portion 5 to the diametrically opposite second end portion 7. The position of the second clamp 13, as mounted or attached to the leaf spring 2, varies along the longitudinal direction L of the leaf spring 2. Because the position of the second clamp 13 is adjustable in its mounted state on the leaf spring 2, the position of the second clamp 13 varies in the direction of the longitudinal axis of the leaf spring without destruction of the second clamp; i.e., non-destructively, and without loss of its function.

Adjusting the position of the second clamp 13 alters its distance from the first clamp 10, changing the length of the connecting path—the distance between the first clamp 10 and second clamp 13, of the first and second spring leaves 11, 12 of the leaf spring 2. The connecting path affecting the spring action of the leaf spring 2, defined by the first and second clamp clamps 10, 13. The respective position of the second clamp 13, influences the spring rate of the leaf spring 2, the ratio of the force acting on the leaf spring 2 to the induced excursion or deflection of the leaf spring 2. Changing the spring rate of the leaf spring 2, besides changing spring action, influences the ground clearance of the motor vehicle which loads the leaf spring 2 with its weight force. A respective change in spring rate can be realized depending on a load condition of the motor vehicle. Since only the position of the second clamp 13 is to be changed, the spring rate of the leaf spring 2 can be easily adjusted in short time in the desired manner. The leaf spring assembly 1 according to the invention has a simple and compact structure and, compared to conventional leaf springs, is not substantially heavier or, due to the design of the second clamp 13, at most slightly heavier.

The leaf spring 2, at least in that part of the suspension portion 9 in which the position of the second clamp 13 varies, has a constant thickness. A compressive force, throughout the positioning range of the second clamp 13 in the suspension portion 9 of the leaf spring 2, is independent of the respective position of the second clamp 13, is substantially constant, and is exerted on the two spring leaves 11, 12 by the second clamp 13. This allows a simpler design of the second clamp 13, because it need not compensate for thickness variations within the positioning range of the suspension portion 9 of the leaf spring 2. The second clamp 13 may be adjusted, throughout its positioning range on the leaf spring 2, easily and with the same force expenditure to any chosen position. The second clamp 13 is conducive to particularly exact positioning at a predetermined location in the suspension portion 9 of the leaf spring, enabling the desired spring rate of the leaf spring 2 and/or the desired ground clearance of the motor vehicle to be set in a purposefully precise manner.

Another embodiment of the invention includes the second clamp 13 transmitting or exerting a compressive force on the first and second spring leaves 11, 12 through at least one elastomeric contact element 19 bearing against respective surfaces of the first and second spring leaves 11, 12 and into these same, respective first and second spring leaves 11, 12. The bearing contact of the elastomeric contact element 19 against both spring leaves 11, 12 allows, in a structurally simple and cost-effective way, establishment of a non-positive connection between the first and second clamps 10, 13 and the two spring leaves 11, 12. The connection enabling displacement or movement of the second clamp 13 on the leaf spring 2 along the longitudinal axis L of the leaf spring 2. The friction force or retention force of this non-positive connection, in the direction of displacement of the second clamp 13, transverse the longitudinal axis L of the leaf spring 2, is dependent on the compressive or clamping force exerted, in the transverse direction, on the respective surfaces of the two spring leaves 11, 12 by the second clamp 13, via the elastomeric contact element 19. The force required to effect a desired change of position of the second clamp 13 in the suspension portion 9 of the leaf spring 2, to change its spring rate and/or to change the ground clearance of the motor vehicle, is that required to surmount the friction force or retention force; however, this force is set sufficiently high to prevent an unwanted displacement of the second clamp 13 due to the operating loads typically generated on the motor vehicle during the use of the leaf spring assembly 1. The non-positive or longitudinally movable connection between the second clamp 13 and leaf spring 2 provides stepless positioning of the second clamp 13 along the longitudinal extent of the leaf spring 2, and a continuous adjustment of the spring rate of the leaf spring and/or ground clearance of the motor vehicle. The elastomeric contact element 19 likewise leads to a force transmission, distributed evenly over the contact element 19, into the two spring leaves 11, 12, even if existing irregularities occur on the respective surfaces of the spring leaves 11, 12.

An additional embodiment includes the at least one elastomeric contact element 19 being an elastomeric roller, rotatably held on the second clamp 13. In this embodiment, the compressive force exerted on the respective first and second spring leaves 11, 12 by the second clamp 13, via the at least one roller 19, is set so the friction force or retention force between the roller 19 and the respective surfaces of the two spring leaves 11, 12 is sufficiently high, in the direction of the longitudinal axis L of the leaf spring 2, to reliably prevent an unwanted change of position of the second clamp 13 due to operating loads typically generated on the motor vehicle during the use of the leaf spring assembly 1. Changing the position of the second clamp 13, no longer requires surmounting or overcoming the friction force or retention force of the non-positive connection between the elastomeric roller 19 and the respective first and second spring 11, 12. Changing the position requires only applying a force inducing a rotation of the elastomeric roller. By rolling the elastomeric roller 19 on the respective contact surfaces of the two spring leaves 11, 12, the second clamp 13 can be accurately positioned, preferably steplessly. Any unwanted rotation of the elastomeric roller 19, for instance during running of the motor vehicle, can be prevented by a suitable locking mechanism operatively connected to the roller, for example a friction brake, a clamping device and the like.

Another embodiment includes using a mechanical, electrical, hydraulic and/or pneumatic actuator to control rotation of the elastomeric roller 19. The actuator can also be formed from hybrids of the above-stated types, for example, an electromechanical, electrohydraulic, electropneumatic actuator and the like. Besides being manually operable, by the user of the motor vehicle, the actuator can activate automatically based on a determined load condition and/or driving condition of the motor vehicle, for example aided by an electronic control unit present in the motor vehicle.

The actuator may be configured to release or close, for example, a locking device preventing any unwanted rotation of the elastomeric roller 19, for instance a friction brake or clamping device, which may require an additional manual or automatically generated force to displace the second clamp 13 on the leaf spring 2 in the direction of the longitudinal axis of the leaf spring 2. The actuator may be configured to drive the elastomeric roller 19 directly, for example, an electric motor, with the interposition of a gear mechanism, configured as a self-locking gear mechanism, may ensure a locking of the rotary movement of the elastomeric roller 19.

In another embodiment the first fastener assembly 6 includes a first fastening eye 23, configured in the first, upper spring leaf end 26 of the first or upper spring leaf 11, and a rubber-metal bushing 24, disposed in the first fastening eye 23. The first fastener assembly 6 pivotally mounts the first or upper spring leaf 11 of the leaf spring 2 to the vehicle body. Rubber-metal bushings, known per se, suffer substantially no wear, and have, a shock-absorbing and soundproofing effect, are cost-effective and suitable for pivotally mounting the first, upper spring leaf end 26 the first or upper spring leaf 11 on the vehicle body.

The second fastener assembly 8 may have a second fastening eye 25, in the second, lower spring leaf end 30 of the second or lower spring leaf 12, and an intermediate connection member 32, mounted in a pivotably movable manner on second, lower spring leaf end 30 wherein the second or lower spring leaf 12 is likewise fastened to the vehicle body 3 in a pivotably movable or rotationally rigid, in this case elastically deformable, manner. The pivotably movable mountings, both the intermediate connection member 32 on the second, lower spring leaf end 30 of the second or lower spring leaf 12 and on the vehicle body 3, can be realized, as described above, by rubber-metal bushings. A rotationally rigid connection of the intermediate connection member 32 on the vehicle body is likewise conceivable, with the intermediate connection member 32 enabling a length compensation of the leaf spring 2 due to compression and rebound movements occurring when operating the motor vehicle. The intermediate connection member 32 can have a substantially elongated shape, for example can be of a rod-shaped configuration.

Another embodiment includes the first or upper spring leaf 11 having a first, upper spring leaf end 26, a second, upper spring leaf end 27 lying diametrically opposite the first, upper spring leaf end 26, and a first or upper spring leaf portion 28 extending between the first and second upper spring leaf ends 26, 27. The second or lower spring leaf 12 has a first, lower spring leaf end 29, a second, lower spring leaf end 30 lying diametrically opposite the first, lower spring leaf end 29, and a second or lower spring leaf portion 31 extending between the first and second lower spring leaf ends 29, 30. The first, upper spring leaf end 26 of the first or upper spring leaf 11 forms the first end portion 5 of the leaf spring 2 and the second, lower spring leaf end 30 of the second or lower spring leaf 12 forms the second end portion 7 of the leaf spring 2. The first or upper spring leaf portion 28 and the second, upper spring leaf end 27 of the first or upper spring leaf 11 and the second or lower spring leaf portion 31 and the first, lower spring leaf end 29 of the second or lower spring leaf 12 together form the suspension portion of the leaf spring 2. As shown, the first or upper spring leaf 11 does not extend from the first end portion 5 of the leaf spring 2 to the second end portion 7 of the leaf spring 2, but only into the suspension portion 9 of the leaf spring 2. Similarly, the second or lower spring leaf 12 does not extend from the second end portion 7 of the leaf spring 2 to the first end portion 5 of the leaf spring 2, but likewise only into the suspension portion 9 of the leaf spring 2. The second, upper spring leaf end 27 of the first or upper spring leaf 11 and the first, lower spring leaf end 29 of the second or spring leaf 12 can be referred to as respective, free ends. In the suspension portion 9 of the leaf spring 2, the two spring leaves 11, 12 overlap and, as described herein, are held pressed one against the other by the first clamp 10 and the second clamp 13.

In a weight-reducing embodiment of the invention, the first clamp 10, fitted in the suspension portion 9 of the leaf spring 2 fastens the rigid axle 4 and corresponding wheel carrier to the leaf spring 2. The first clamp 10 provides both the compressive or clamping force exerted on the two spring leaves 11, 12 and a fastening option for the wheel carrier.

The leaf spring 2 may be formed of a fiber composite, for example a fiber-reinforced plastics material, or a metal material, for example a steel material.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A leaf spring assembly for a motor vehicle wheel suspension comprising;
    a leaf spring having a first end portion, including a first fastener assembly, a second end portion, diametrically opposite said first end portion, including a second fastener assembly, and a suspension portion, extending between the two end portions, said leaf spring having a plurality of spring leaves;
    a first clamp attached to said leaf spring, said first clamp in the suspension portion and pressing said spring leaves against one another; and
    a second clamp attached to said leaf spring, said second clamp in the suspension portion and pressing said spring leaves against one another, said second clamp positioned longitudinally spaced from said first clamp in the direction of a longitudinal axis of said leaf spring wherein the position of the second clamp varies in the direction of the longitudinal axis of the leaf spring;
    wherein a portion of said the leaf spring in said suspension portion in which the second clamp varies has a constant thickness;
    wherein the spring leaves include an upper spring leaf and a lower spring leaf, and the second clamp transmits a compressive force, exerted on said upper spring leaf and said lower spring leaf via at least one elastomeric contact element bearing against a respective surface of said upper spring leaf and said lower spring leaf; and wherein the at least one elastomeric contact element includes an elastomeric roller rotatably mounted on the second clamp.

2. The leaf spring assembly of claim 1 including an actuator connected to said elastomeric roller.

3. The leaf spring assembly of claim 1 wherein said first fastener assembly includes a fastening eye configured in said first end portion of said leaf spring and a rubber-metal bushing disposed in the fastening eye.

4. The leaf spring assembly of claim 1 wherein the second fastener assembly includes a fastening eye, configured in said second end portion of the leaf spring, and an intermediate connection member, pivotally mounted to said second end portion and pivotally mounted to a vehicle body in a rotationally rigid and elastically deformable manner.

5. The leaf spring assembly of claim 1 wherein the first clamp connects the suspension portion of the leaf spring to a wheel carrier.

6. The leaf spring assembly of claim 1 wherein the leaf spring is formed of a composite material.

7. A leaf spring assembly for a motor vehicle wheel suspension comprising;
a leaf spring having a first end portion, including having a first fastener assembly, a second end portion, diametrically opposite said first end portion, including a second fastener assembly, and a suspension portion, extending between the two end portions, said leaf spring having a plurality of spring leaves;
a first clamp attached to said leaf spring, said first clamp in the suspension portion and pressing said spring leaves against one another; and
a second clamp attached to said leaf spring, said second clamp in the suspension portion and pressing said spring leaves against one another, said second clamp positioned longitudinally spaced from said first clamp in the direction of a longitudinal axis of said leaf spring wherein the position of the second clamp varies in the direction of the longitudinal axis of the leaf spring;
wherein a portion of said the leaf spring in said suspension portion in which the position second clamp varies has a constant thickness;
wherein the spring leaves include an upper spring leaf and a lower spring leaf, and the second clamp transmits a compressive force, exerted on said upper spring leaf and said lower spring leaf via an elastomeric contact element bearing against a respective surface of said upper spring leaf and said lower spring leaf;
the upper spring leaf having a first, upper spring leaf end, a second, upper spring leaf end opposite the first, upper spring leaf end, and an upper spring leaf portion extending between the first and second upper spring leaf ends;
the lower spring leaf having a first, lower spring leaf end, a second, lower spring leaf end opposite the first, lower spring leaf end, and a lower spring leaf portion extending between the first and second, lower spring leaf ends, wherein the first, upper spring leaf end of the upper spring leaf forms the first end portion of the leaf spring and the second, lower spring leaf end of the lower spring leaf forms the second end portion of the leaf spring; and
the upper spring leaf portion and the second, upper spring leaf end of the upper spring leaf, the lower spring leaf portion, and the first, lower spring leaf end of the lower spring leaf together form the suspension portion of the leaf spring.

8. A leaf spring assembly for a motor vehicle wheel suspension comprising:
a leaf spring having a first end portion, a second end portion, opposite said first end portion, and a suspension portion extending between the two end portions, said leaf spring including a plurality of spring leaves;
a first clamp attached to said leaf spring, said first clamp fixed in set position in the suspension portion and pressing said spring leaves against one another, said first clamp connecting a wheel carrier to said leaf spring;
a second clamp including an elastomeric contact element attached to said leaf spring, said second clamp in the suspension portion and said elastomeric contact element pressing said spring leaves against one another, said second clamp positioned longitudinally spaced from said first clamp in the direction of a longitudinal axis of said leaf spring wherein the position of the second clamp in the suspension portion varies in the direction of the longitudinal axis of the leaf spring;
a portion of said leaf spring in said suspension portion in which the position of second clamp varies has a constant thickness;
an upper spring leaf having a first, upper spring leaf end, a second, upper spring leaf end opposite the first, upper spring leaf end, and an upper spring leaf portion extending between the first and second upper spring leaf ends;
a lower spring leaf having a first, lower spring leaf end, a second, lower spring leaf end opposite the first, lower spring leaf end, and a lower spring leaf portion extending between the first and second, lower spring leaf ends, wherein the first, upper spring leaf end of the upper spring leaf forms the first end portion of the leaf spring and the second, lower spring leaf end of the lower spring leaf forms the second end portion of the leaf spring; and
the upper spring leaf portion and the second, upper spring leaf end of the upper spring leaf, the lower spring leaf portion, and the first, lower spring leaf end of the lower spring leaf together form the suspension portion of the leaf spring.

9. The leaf spring assembly of claim 8 wherein the elastomeric contact element includes an elastomeric roller rotatably mounted on the second clamp.

10. The leaf spring assembly of claim 9 including an actuator connected to said elastomeric roller.

11. The leaf spring assembly of claim 8 including:
a first fastener assembly connecting said leaf spring to a vehicle body, said first fastener assembly including a fastening eye at said first, upper spring leaf end of said upper leaf spring and a rubber-metal bushing disposed in the fastening eye; and
a second fastener assembly connecting said leaf spring to a vehicle body, said second fastener assembly including a fastening eye, at said second, lower spring leaf end of said lower leaf spring and an intermediate connection member, pivotally connecting said second, lower spring leaf end and said vehicle body.

12. A leaf spring assembly for a motor vehicle wheel suspension comprising;
a leaf spring having a first end portion, including a first fastener assembly, a second end portion, diametrically opposite said first end portion, including a second fastener assembly, and a suspension portion, extending between the two end portions, said leaf spring having a plurality of spring leaves;

a first clamp attached to said leaf spring, said first clamp in the suspension portion and pressing said spring leaves against one another; and a second clamp attached to said leaf spring, said second clamp in the suspension portion and pressing said spring leaves against one another, said second clamp positioned longitudinally spaced from said first clamp in the direction of a longitudinal axis of said leaf spring wherein the position of the second clamp varies in the direction of the longitudinal axis of the leaf spring;

said second clamp including a pressure plate; and an elastomeric roller rotatably mounted in the pressure plate, the elastomeric roller bearing against said the spring.

\* \* \* \* \*